(12) United States Patent
Grethel et al.

(10) Patent No.: US 12,005,769 B2
(45) Date of Patent: Jun. 11, 2024

(54) HYDRAULIC ARRANGEMENT AND ELECTRICALLY OPERABLE, MULTIGEAR AXLE DRIVE TRAIN

(71) Applicant: Schaeffler Technologies AG & Co. KG, Herzogenaurach (DE)

(72) Inventors: Marco Grethel, Bühlertal (DE); Carsten Mayer, Lohr a. Main (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/266,858

(22) PCT Filed: Oct. 8, 2021

(86) PCT No.: PCT/DE2021/100815
§ 371 (c)(1),
(2) Date: Jun. 13, 2023

(87) PCT Pub. No.: WO2022/127966
PCT Pub. Date: Jun. 23, 2022

(65) Prior Publication Data
US 2024/0100928 A1    Mar. 28, 2024

(30) Foreign Application Priority Data

Dec. 14, 2020   (DE) .................. 10 2020 133 343.9
Feb. 22, 2021   (DE) .................. 10 2021 104 151.1

(51) Int. Cl.
*B60K 1/00*       (2006.01)
*B60K 17/10*      (2006.01)
*F16H 61/00*      (2006.01)

(52) U.S. Cl.
CPC .............. *B60K 1/00* (2013.01); *B60K 17/105* (2013.01); *F16H 61/0009* (2013.01); *F16H 61/0031* (2013.01); *B60K 2001/001* (2013.01)

(58) Field of Classification Search
CPC .. B60K 1/00; B60K 17/105; B60K 2001/001; F16H 61/0009; F16H 61/0031
See application file for complete search history.

(56) References Cited

U.S. PATENT DOCUMENTS 4,813,510 A  *  3/1989  Lexen ................ B60K 6/12
                                                  180/165
8,105,203 B2     1/2012  Ishii
(Continued)

FOREIGN PATENT DOCUMENTS

DE        10318152 A1    11/2004
DE    102011100810 A1    11/2012
(Continued)

*Primary Examiner* — Hoang M Nguyen

(57) ABSTRACT

A hydraulic arrangement for an electrically operable, multigear axle drive train of a motor vehicle comprises a hydraulic circuit in which a hydraulic fluid is guided, a hydraulic pump arranged to apply pressure to the hydraulic fluid within the hydraulic circuit, a first hydraulic path arranged to connect a first clutch device to the hydraulic circuit, and a second hydraulic path arranged to connect a second clutch device to the hydraulic circuit. The first and second clutch devices are each arranged to actuate a gear selection device of the electrically operable axle drive train.

20 Claims, 6 Drawing Sheets

(56) References Cited

U.S. PATENT DOCUMENTS

| | | | | |
|---|---|---|---|---|
| 2002/0026793 A1* | 3/2002 | Ishimaru | ............. | F16H 61/4139 60/487 |
| 2005/0016304 A1* | 1/2005 | Ishii | ....................... | B60K 17/28 74/50 |
| 2008/0087337 A1* | 4/2008 | Grethel | .................... | F16D 48/02 251/337 |
| 2009/0045026 A1* | 2/2009 | Ishii | ........................ | F16H 3/006 192/85.42 |
| 2009/0215585 A1* | 8/2009 | Grethel | ............... | F16H 61/0031 477/79 |

FOREIGN PATENT DOCUMENTS

| | | | |
|---|---|---|---|
| DE | 102019100970 A1 | 7/2020 | |
| DE | 102019125697 A1 | 2/2021 | |
| DE | 102019123965 A1 | 3/2021 | |
| DE | 102020120988 B3 | 11/2021 | |
| EP | 2797766 A1 | 11/2014 | |
| WO | 2004097265 A1 | 11/2004 | |
| WO | 2008106920 A1 | 9/2008 | |

* cited by examiner

HYDRAULIC ARRANGEMENT AND ELECTRICALLY OPERABLE, MULTIGEAR AXLE DRIVE TRAIN

CROSS-REFERENCE TO RELATED APPLICATIONS

This application is the U.S. National Phase of PCT Appln. No. PCT/DE2021/100815 filed Oct. 8, 2021, which claims priority to DE 102021104151.1 filed Feb. 22, 2021, which in turn claims priority to DE 102020133343.9 filed Dec. 14, 2020, the entire disclosures of which are incorporated by reference herein.

TECHNICAL FIELD

The present disclosure relates to a hydraulic arrangement for an electrically operable, multigear axle drive train of a motor vehicle, comprising: a hydraulic circuit in which a hydraulic fluid is guided, at least one hydraulic pump for applying pressure to the hydraulic fluid within the hydraulic circuit, a first clutch device and a second clutch device for actuating a gear selection device of the electrically operable axle drive train, wherein the first clutch device is connected to the hydraulic circuit via a first hydraulic path, and the second clutch device is connected to the hydraulic circuit via a second hydraulic path. The present disclosure further relates to an electrically operable, multigear axle drive train.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, 05/2011, pages 360-365 by Erik Schneider, Frank Fickl, Bernd Cebulski and Jens Liebold with the title: "Highly integrative and flexible electric drive unit for e-vehicles.". This article describes a drive unit for an axle of a vehicle, which comprises an electric motor that is arranged concentrically and coaxially with a bevel gear differential, wherein a switchable 2-speed planetary gear set is arranged in the drive train between the electric motor and the bevel gear differential, which is also positioned coaxially to the electric motor or the bevel gear differential or spur gear differential. The drive unit is very compact and allows a good compromise between climbing ability, acceleration and energy consumption due to the switchable 2-speed planetary gear set. Such drive units are also referred to as e-axles or electrically operable drive trains.

Such electrically operable drive trains generally require hydraulic devices for cooling and/or for switching operations in a switchable transmission. In such vehicles with multigear electric axles, hydraulic devices such as clutches and/or brakes are used in order to change gears without interrupting traction. For safety reasons, it must be ensured that unwanted wheel torques or even wheel blockages are avoided in every operating state. This is true, in particular, when the driven axle is the rear axle of the vehicle.

SUMMARY

The present disclosure provides, according to an exemplary embodiment, a hydraulic arrangement for an electrically operable, multigear axle drive train of a motor vehicle that reduces or completely eliminates the problems described above and provides increased security against unwanted blocking or unwanted torque application.

The hydraulic arrangement comprises: a hydraulic circuit in which a hydraulic fluid is guided, at least one hydraulic pump for applying pressure to the hydraulic fluid within the hydraulic circuit, a first clutch device and a second clutch device for actuating a gear selection device of the electrically operable axle drive train, wherein the first clutch device is connected to the hydraulic circuit via a first hydraulic path, and the second clutch device is connected to the hydraulic circuit via a second hydraulic path, wherein the first hydraulic path has a first non-return valve for connection to the hydraulic circuit and a first switching valve connected downstream in the first hydraulic path, wherein a third hydraulic path engaging between the first switching valve and the first clutch device connects the first hydraulic path to the hydraulic circuit, and the second hydraulic path has a second non-return valve for connection to the hydraulic circuit and a second switching valve connected downstream in the second hydraulic path, wherein a fourth hydraulic path engaging between the second switching valve and the second the clutch device connects the second hydraulic path to the hydraulic circuit, wherein at least one passive bypass valve is arranged in the third hydraulic path and/or the fourth hydraulic path.

This hydraulic switching topology has the advantage that when the clutch devices are actuated in a multigear axle drive train, in the event of possible malfunctions of the switching valves provided for the clutch devices, a necessary pressure reduction can also take place very quickly via a separate hydraulic path. The hydraulic arrangement according to the present disclosure can thus provide increased security, for example against an undesired wheel blockage due to a malfunction of a switching valve provided for pressure reduction. In addition, the use of passive hydraulic components means that the hydraulic arrangement can be implemented in a cost-effective and operationally reliable manner.

The bypass valve is controlled by the system pressure of the hydraulic circuit acting on it. This can be ensured, for example, by suitably designing the area ratios in the bypass valve, so that the bypass valves are kept closed even when the system pressure is reduced (small offset above the cooling oil pressure level). At the same time, the pressure level for opening the bypass valves must be set in such a way that a drop in the system pressure to the cooling oil pressure level reliably leads to the bypass valves opening.

Exemplary embodiments of the present disclosure are described below.

An electric axle drive train of a motor vehicle comprises an electric machine and a transmission arrangement, wherein the electric machine and the transmission arrangement form a structural unit.

Provision can in particular be made for the electric machine and the transmission arrangement to be arranged in a common drive train housing. Alternatively, it would of course also be possible for the electric machine to have a motor housing and the transmission to have a transmission housing, in which case the structural unit can then be effected by fixing the transmission arrangement in relation to the electric machine. This structural unit is sometimes also referred to as an E-axle. The electric machine and transmission arrangement can also be housed in a drive train housing. The drive train housing is provided at least for receiving the electric machine and the transmission arrangement.

An electric machine serves to convert electrical energy into mechanical energy and/or vice versa, and generally comprises a stationary part referred to as a stator, stand, or armature, and a part referred to as a rotor or runner, and arranged to be movable relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In connection with the present disclosure, the electric machine can be designed as a radial or axial flux machine.

The electric machine is intended in particular for use within an electrically operable drive train of a motor vehicle.

In particular, the electric machine is dimensioned in such a way that vehicle speeds of more than 50 km/h, preferably more than 80 km/h and in particular more than 100 km/h can be achieved. The electric motor particularly preferably has an output of more than 30 kW, preferably more than 50 kW and in particular more than 70 kW. Furthermore, it is preferred that the electric machine provides speeds greater than 5,000 rpm, particularly preferably greater than 10,000 rpm, very particularly preferably greater than 12,500 rpm.

The transmission arrangement of the electric axle drive train can, in particular, be coupled to the electric machine, which is designed to generate a drive torque for the motor vehicle. The drive torque may be a main drive torque, so that the motor vehicle is driven exclusively by the drive torque.

The transmission arrangement can have a differential transmission. A differential transmission is a planetary gearing with one input and two outputs. It usually has the function of driving two vehicle wheels of a motor vehicle in such a way that they can turn at different speeds in curves, but with the same propulsive force.

The electrically operable axle drive train can also have a torque vectoring module, using which the torque of an electrically operable axle drive train can be distributed in a wheel-selective manner. This can be implemented, for example, by using an electromechanically driven, three-stage planetary gearing, of the so-called superimposition gearing.

One or both of the clutch arrangements can also be configured as a brake, in which case the inner plates or the outer plates of the plate pack of the respective clutch arrangement are mounted in a non-rotatable manner with respect to the rotor, for example on a housing component.

According to an embodiment of the present disclosure, a third non-return valve can be arranged in the third hydraulic path as a passive bypass valve and/or a fourth non-return valve can be arranged in the fourth hydraulic path as a passive bypass valve. The advantage of this configuration is that a simple and inexpensive hydraulic valve can be used with a non-return valve. According to another embodiment of the present disclosure, in the third hydraulic path a first 2/2 seat valve can be arranged as a passive bypass valve and/or in the fourth hydraulic path a second 2/2 seat valve can be arranged as a passive bypass valve.

Furthermore, a first 3/2 seat valve can be arranged in the third hydraulic path as a passive bypass valve, wherein an input of the first 3/2 seat valve is connected to the third hydraulic path and an output of the first 3/2 seat valve opens into the hydraulic reservoir, and the first 3/2 seat valve can be switched into an open and a closed valve position via the system pressure applied in a fifth hydraulic path connected to the hydraulic circuit and/or a second 3/2 seat valve is arranged in the fourth hydraulic path as a passive bypass valve, wherein an input of the second 3/2 seat valve is connected to the fourth hydraulic path and an output of the second 3/2 seat valve opens into the hydraulic reservoir, and the second 3/2 seat valve can be switched into an open and a closed valve position via the system pressure applied in a fifth hydraulic path connected to the hydraulic circuit. The first and/or second seat valve can be configured as a 3/2 valve, wherein one connection of the 3/2 valve is connected to the hydraulic reservoir of the hydraulic device. This additional connection to the hydraulic reservoir on the 3/2 valve has the advantage that the hydraulic pressure in the first or second hydraulic path can be implemented even more quickly due to the direct connection to the pressure level of the hydraulic reservoir, whereby a desired safe operating state of a clutch device, in particular at low temperatures, can be achieved more quickly.

Furthermore, according to another embodiment of the present disclosure, the third hydraulic path and the fourth hydraulic path can be connected via an OR valve, so that with the interposition of the passive bypass valve, either the third hydraulic path or the fourth hydraulic path can be hydraulically coupled to the hydraulic reservoir.

The advantageous effect of this configuration is based on the fact that one of the bypass valves can be dispensed with and instead an OR valve is introduced into the hydraulic switching topology that connects the two clutch pressures (or the higher one) with the one bypass valve. The bypass valve can be designed, for example, as a 2/2 valve or as a 3/2 valve. This embodiment is based on the consideration that it is unlikely that both switching valves for the two clutch devices will fail at the same time and both clutch devices will have to be opened via the bypass valves. In the event that, for example, one of the switching valves is jammed, the hydraulic pressure at the associated clutch device will not drop and will therefore be higher than at the other. Thus, the OR valve will connect the hydraulic path of the faulty non-opening clutch device to the bypass valve, which in turn will open and allow the clutch pressure to dissipate.

According to another embodiment of the disclosure, the opening pressure of the bypass valves in the hydraulic paths can be lower than the clutch pressure of the clutch devices, and can particularly preferably be lower than 4 bar, very particularly preferably lower than 2 bar.

The bypass valve is thus configured in particular in such a way that, due to the system pressure acting on it, it is initially able to keep the bypass valve closed against the clutch pressure. The control pressure of the bypass valve is coupled to the system pressure, wherein the system pressure can temporarily be significantly below the clutch pressure in order to save energy, but with this lowered system pressure down to the pressure threshold of the clutch pressure of, for example, 2 to 4 bar, the clutch devices may not yet be opened or may not be transferred to their disengaged operating state. The opening of the bypass valve may thus only take place when the clutch pressure falls below the pressure threshold of 2 to 4 bar, by lowering the system pressure below this threshold in an emergency.

The advantage of this configuration is that in constant driving states the system pressure in the hydraulic circuit and thus the energy consumption of the system can be reduced without provoking the bypass valves to open.

In another embodiment of the present disclosure, the opening pressure of one of the bypass valves, preferably all bypass valves in the hydraulic paths, can be greater than the cooling oil pressure in the cooling line.

It can also be advantageous to further develop the present disclosure such that one of the passive bypass valves is triggered via a system pressure valve and/or via the hydraulic pump.

According to another embodiment of the present disclosure, the first clutch device and/or the second clutch device can be configured as a brake.

Finally, at least one passive bypass valve can have an area ratio of between 1:5-1:15 between the first area connected to the system pressure and the second area of a translationally displaceable valve closure connected to the clutch pressure. This area ratio can be used in particular to keep the valve closure closed against the clutch pressure, which can be higher than the opening pressure or system pressure.

The present disclosure further provides an electrically operable, multigear axle drive train of a motor vehicle, comprising a hydraulic arrangement with a hydraulic circuit in which a hydraulic fluid is guided, at least one hydraulic pump for applying pressure to the hydraulic fluid within the hydraulic circuit, a first clutch device and a second clutch device for actuating a gear selection device of the electrically operable axle drive train, wherein the first clutch device is connected to the hydraulic circuit via a first hydraulic path, and the second clutch device is connected to the hydraulic circuit via a second hydraulic path.

BRIEF DESCRIPTION OF THE DRAWINGS

The present disclosure will be explained in more detail below with reference to figures without limiting the general concept of the present disclosure.

In the figures.

DETAILED DESCRIPTION

Figure 3:
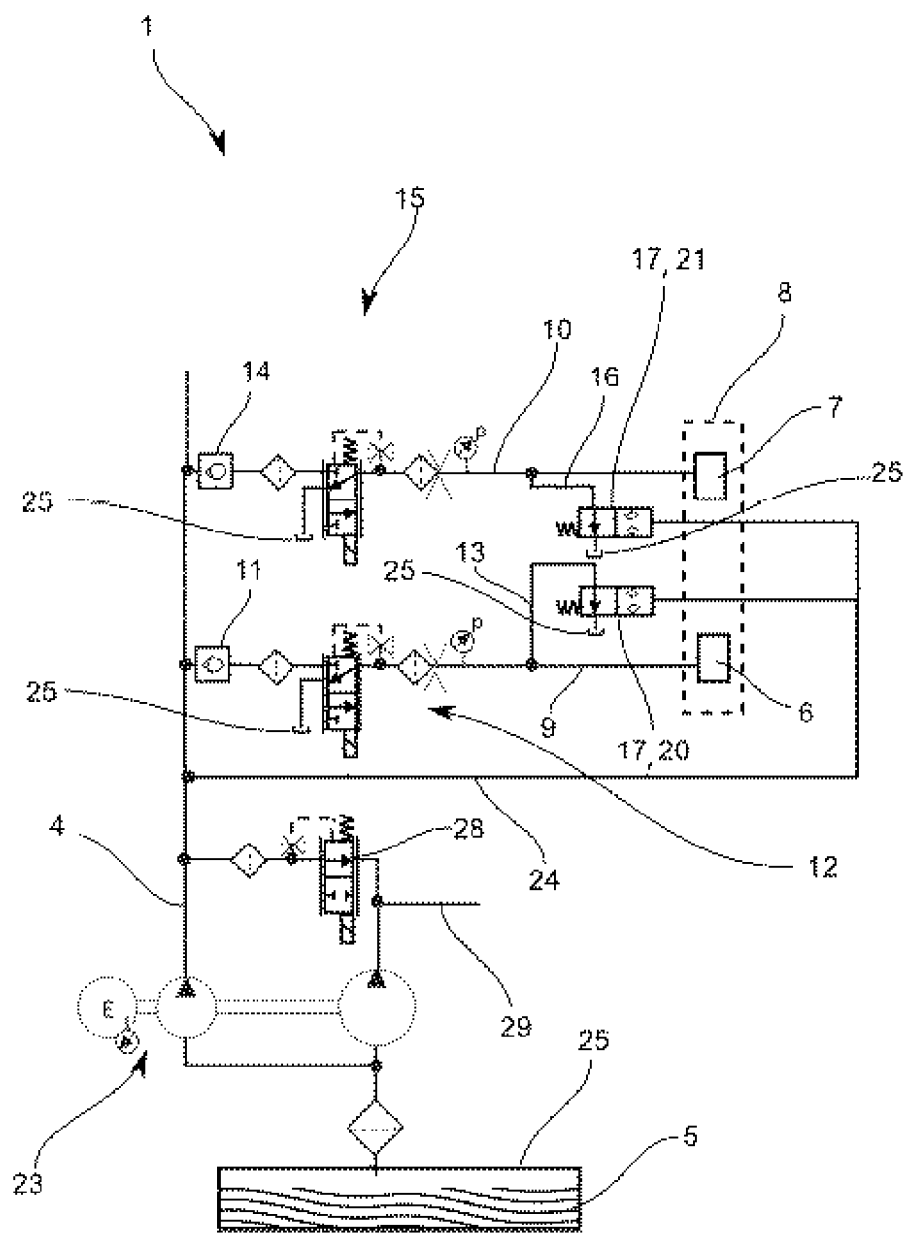
FIG. 3 shows a hydraulic circuit diagram of another exemplary embodiment of a hydraulic arrangement for an electrically operable, multigear axle drive train of a motor vehicle.
Figure 4:
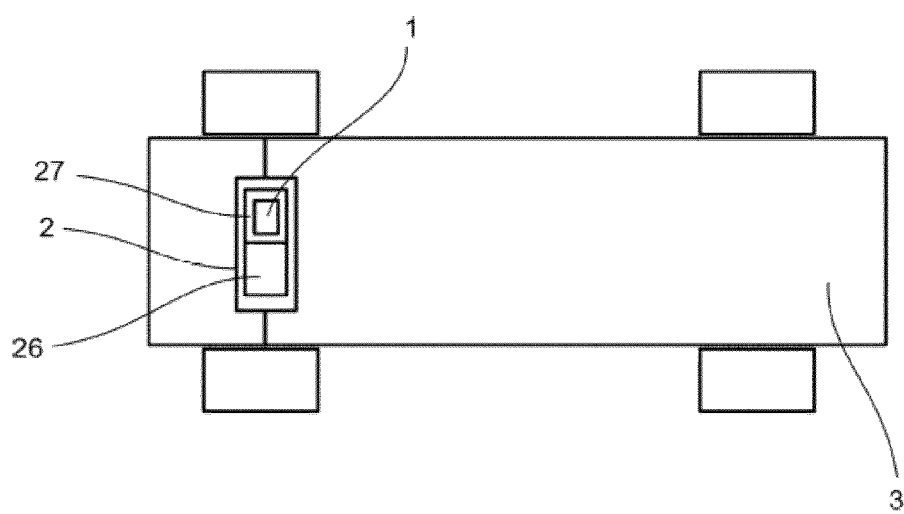
FIG. 4 shows a block diagram of a motor vehicle with an electrically operable, multigear axle drive train.

FIG. 4 shows a hydraulic arrangement 1 for an electrically operable, multigear axle drive train 2 of a motor vehicle 3. The axle drive train 2 comprises an electric machine 26 and a switchable transmission arrangement 27. The switchable transmission arrangement 27 has a gear selection device 8 with a first and a second clutch device 6, 7, which is explained in more detail below with reference to the hydraulic switching topologies of FIGS. 1-3.

Figure 1:
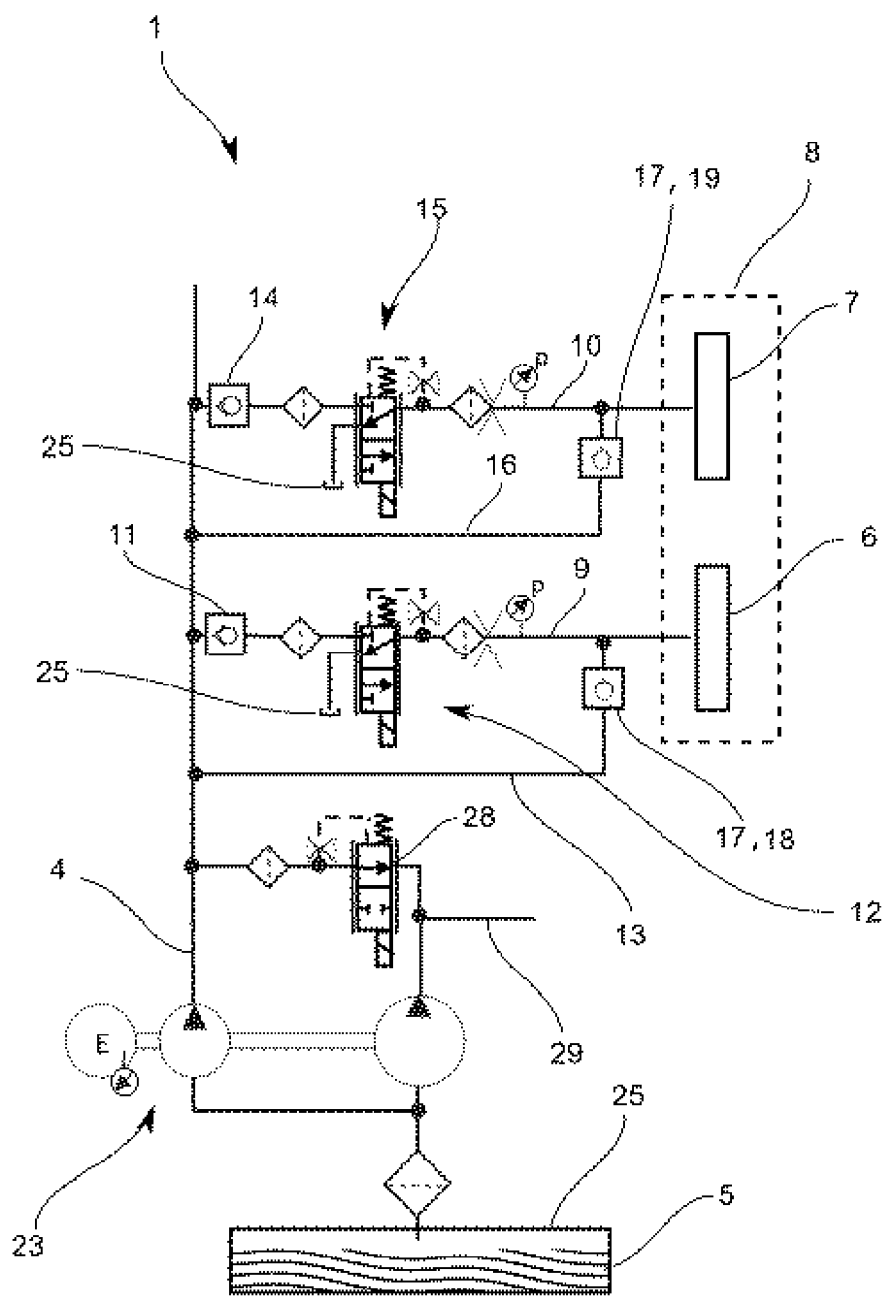
FIG. 1 shows a hydraulic circuit diagram of an exemplary embodiment of a hydraulic arrangement for an electrically operable, multigear axle drive train of a motor vehicle.

The hydraulic arrangement 1 shown in FIG. 1 comprises a hydraulic circuit 4 in which a hydraulic fluid 5 is guided, which is fed from a hydraulic reservoir 25 into the circuit 4. For this purpose, a hydraulic pump 23 is provided for conveying and applying pressure to the hydraulic fluid 5 within the hydraulic circuit 4.

The hydraulic pump 23 is designed here as a tandem pump. The larger pump part (right) of the hydraulic pump 23 conveys a large volume of hydraulic fluid 5 at low pressure as cooling fluid in a cooling line 29, for example to wet-operated friction clutches, brakes, transmission elements and/or the like, which are not shown. The smaller pump part (left) of the hydraulic pump 23 builds up the system pressure in the hydraulic circuit 4, which is usually greater than the cooling oil pressure in the cooling line 29. In particular, the hydraulic pump 23 can build up a system pressure in the hydraulic circuit 4 which corresponds at least to the clutch pressure for engaging the clutch devices 6, 7. The system pressure present in the hydraulic circuit 4 is set on the one hand by the speed of the hydraulic pump 23 and on the other hand by a system pressure valve 28. The system pressure valve 28 connects the hydraulic circuit 4 with the cooling line 29 to adjust the system pressure.

A first clutch device 6 and a second clutch device 7 are coupled to the hydraulic circuit 4 for actuating a gear selection device 8 of the electrically operable axle drive train 2 in that the first clutch device 6 is connected to the hydraulic circuit 4 via a first hydraulic path 9 and the second clutch device 7 is connected to the hydraulic circuit 4 via a second hydraulic path 10. Both the first clutch device 6 and the second clutch device 7 are configured here as brakes. The clutch devices 6, 7 can be switched hydraulically via switching valves 12, 15, i.e., in particular into a first switching position which prevents rotation of a gear wheel within the multigear transmission arrangement 29 and into a second switching position in which rotation of a gear wheel is made possible.

The switching valves 12,15 are each designed as electrically switchable 2-way valves, wherein one output of the switching valves 12, 15 is hydraulically connected to the hydraulic reservoir 25 in each case.

The first hydraulic path 9 has a first non-return valve 11 for connection to the hydraulic circuit 4 and a first switching valve 12 connected downstream in the first hydraulic path 9, wherein a third hydraulic path 13 engaging between the first switching valve 12 and the first clutch device 6 connects the first hydraulic path 9 to the hydraulic circuit 4.

Likewise, the second hydraulic path 10 has a second non-return valve 14 for connection to the hydraulic circuit 4 and a second switching valve 15 connected downstream in the second hydraulic path 10, wherein a fourth hydraulic path 16 engaging between the second switching valve 15 and the second the clutch device 7 connects the second hydraulic path 10 to the hydraulic circuit 4.

The non-return valves 11, 14 are configured in such a way that they open when a predefined system pressure in the hydraulic circuit 4 is exceeded, so that the system pressure can be switched to the clutch devices 6, 7 via the switching valves 12, 15. This configuration makes it possible to lower the system pressure in the hydraulic circuit 4 after a one-time buildup of the system pressure in the first and second hydraulic paths 9, 10, wherein via the still prevailing system pressure in the hydraulic paths 9, 10, the clutch devices 6, 7 are still held in their engaged operating position, wherein this pressure is also referred to as clutch pressure. This has the advantage that the hydraulic pump 23 does not have to be operated or only has to be operated with reduced operating power in order to maintain the engaged operating state of the clutch devices 6, 7.

A passive bypass valve 17 is arranged in the third hydraulic path 13 and the fourth hydraulic path 16 respectively. In the embodiment of the hydraulic arrangement 1 shown in FIG. 1, a third non-return valve 18 is arranged in the third hydraulic path 13 as a passive bypass valve 17 and a fourth non-return valve 19 is arranged in the fourth hydraulic path 16 as a passive bypass valve 17.

In normal operation of the hydraulic arrangement 1, the hydraulic fluid 5, which is under pressure in the hydraulic paths 9, 10, can flow into the hydraulic reservoir 25 via the switching valves 12, 15 in order to separate the torque transmission through the clutch devices 6, 7. This switching position of the switching valves 12,15 is shown in the hydraulic circuit diagram of FIGS. 1-3.

In the event of a fault, i.e., if the first switching valve 12 and/or the second switching valve 15 fails or jams, the pressure in the affected hydraulic path 9, 10 cannot initially be reduced, so that in the event of a fault the corresponding clutch device 6, 7 remains in its engaged operating state.

However, by lowering the system pressure in the hydraulic circuit 4, the corresponding bypass valve 17 can now be opened and in this way the torque transmission can be safely separated by the corresponding clutch device 6, 7, in that the pressure in the affected hydraulic path 9, 10 is lowered to the applied pressure level of the hydraulic circuit 4. In the exemplary embodiment of FIG. 1, the third hydraulic path 13 and the fourth hydraulic path 16 are hydraulically conductively connected to the hydraulic circuit 4, i.e., hydraulic fluid 5 from the first hydraulic path 9 and/or the second hydraulic path 10 can flow directly into the hydraulic circuit 4 via the bypass valves 17. The third hydraulic path 13 and the fourth hydraulic path 16 thus serve both as a control line for the bypass valves 17 and as a drainage line for the hydraulic fluid 5.

As already explained above, the system pressure within the hydraulic circuit 4 for supplying the two switching valves 12, 15, which can also be referred to as pressure regulators, can be temporarily lowered with the help of the upstream non-return valves 11, 14. This could be done, for example, by designing the pump 23 as a reversible pump or by means of the system pressure valve 28. The pressure reduction is effected either to the filling pressure level of the open clutch devices 6, 7 or to the cooling oil pressure level of the cooling line 29. Both pressure levels are typically in the range between 0.5 and 4 bar. In the exemplary embodiment shown here, these pressure levels are around 2 bar. The opening pressure at the bypass valves 17 should therefore be slightly greater than the cooling oil pressure level in the hydraulic circuit 4 when this is applied in the hydraulic circuit 4 in a correspondingly switched manner by the system pressure valve 28.

However, the opening pressure of the bypass valves 17 is at the same time lower than the clutch pressure, in particular the opening pressure corresponds to between 0.05-0.5 times the clutch pressure.

In the embodiment shown in FIG. 1, the bypass valves 17 are designed as 2/2 seat valves 18, 19.

Another embodiment of a hydraulic arrangement 1 is shown in FIG. 3. In contrast to the embodiment shown in FIG. 1, here in the third hydraulic path 13 a first 3/2 seat valve 20 is arranged as a passive bypass valve 17 and in the fourth hydraulic path 16 a second 3/2 seat valve 21 is arranged as a passive bypass valve 17. One connection each of the 3/2 valves is connected to the hydraulic reservoir 25 of the hydraulic device 1, whereby the hydraulic pressure in the first or second hydraulic path 13, 16 can be reached even faster due to the direct connection to the pressure level of the hydraulic reservoir 25.

The first hydraulic path 13 and the second hydraulic path 16 each open into the hydraulic reservoir 25 behind the bypass valves 17 and are switched via the fifth hydraulic path 24 which is connected to the hydraulic circuit 4. If the pressure in the fifth hydraulic path 24 falls below a predefined pressure level, one or both of the bypass valves 17 can open and the pressure from the corresponding first hydraulic path 9 and/or second hydraulic path 10 can be reduced directly to the pressure level prevailing in the hydraulic reservoir 25 so that the clutch devices 6, 7 can be securely transferred into their open position.

In contrast to the exemplary embodiment in FIG. 1, in which the third hydraulic path 13 and the fourth hydraulic path 16 are hydraulically conductively connected to the hydraulic circuit 4, the hydraulic fluid 5 in the embodiment shown in FIG. 3 does not flow out of the first hydraulic path 9 and/or or the second hydraulic path 10 via the bypass valves 17 back into the hydraulic circuit 4, but rather directly into the hydraulic reservoir 25. In the embodiment of FIG. 3, the third hydraulic path 13 and the fourth hydraulic path 16 do not, as in the embodiment of FIG. 1, serve as a control line for the bypass valves, but only as a drainage line for the hydraulic fluid 5 from the first and second hydraulic path 9, 10. The control line or the necessary control pressure for switching the seat valves 20, 21 is implemented by the fifth hydraulic path 24, as already explained above.

Another embodiment of a hydraulic arrangement 1 is explained with reference to FIG. 2. Unlike in the embodiments of FIGS. 1 and 3, the third hydraulic path 13 and the fourth hydraulic path 16 are connected via an OR valve 22, so that with the interposition of the passive bypass valve 17 either the third hydraulic path 13 or the fourth hydraulic path 16 can be hydraulically coupled to the hydraulic reservoir 25. The system pressure of the hydraulic circuit 4 present in the fifth hydraulic path 24 serves as the control pressure for the bypass valve 17. The OR valve 22 thus connects the hydraulic path 13, 16, in which the higher pressure is present, to the bypass valve 17.

Figure 5:
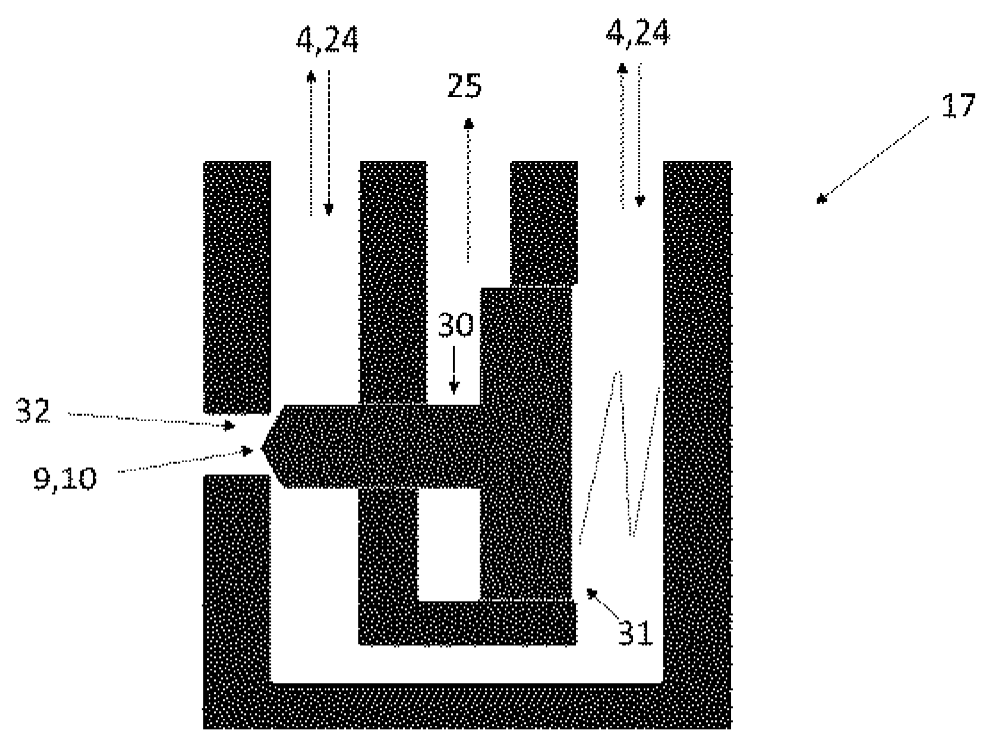
FIG. 5 shows a schematic representation of a 2/2 seat valve.

FIG. 5 shows a possible embodiment for a 2/2-seat valve 18, 19 as a passive bypass valve 17, as shown in FIG. 1. This illustration shows that the passive bypass valve 17 has an area ratio between a first area 31, which is connected to the system pressure, and a second area 32 of a translationally displaceable valve closure 30, which is connected to the clutch pressure, of between 1:5-1:15. The connection designated with the hydraulic reservoir 25 is not a "real" connection. This is a pressure relief against the environment, for example the tank pressure level, in order to simply implement the required effective areas 31, 32 between the clutch pressure and the system pressure. The functional designation of the bypass valve 17 as a 2/2 seat valve is therefore permissible. This area ratio can be used in particular to keep valve closure 30 closed against the clutch pressure, which can be higher than the opening pressure or system pressure.

Figure 2:
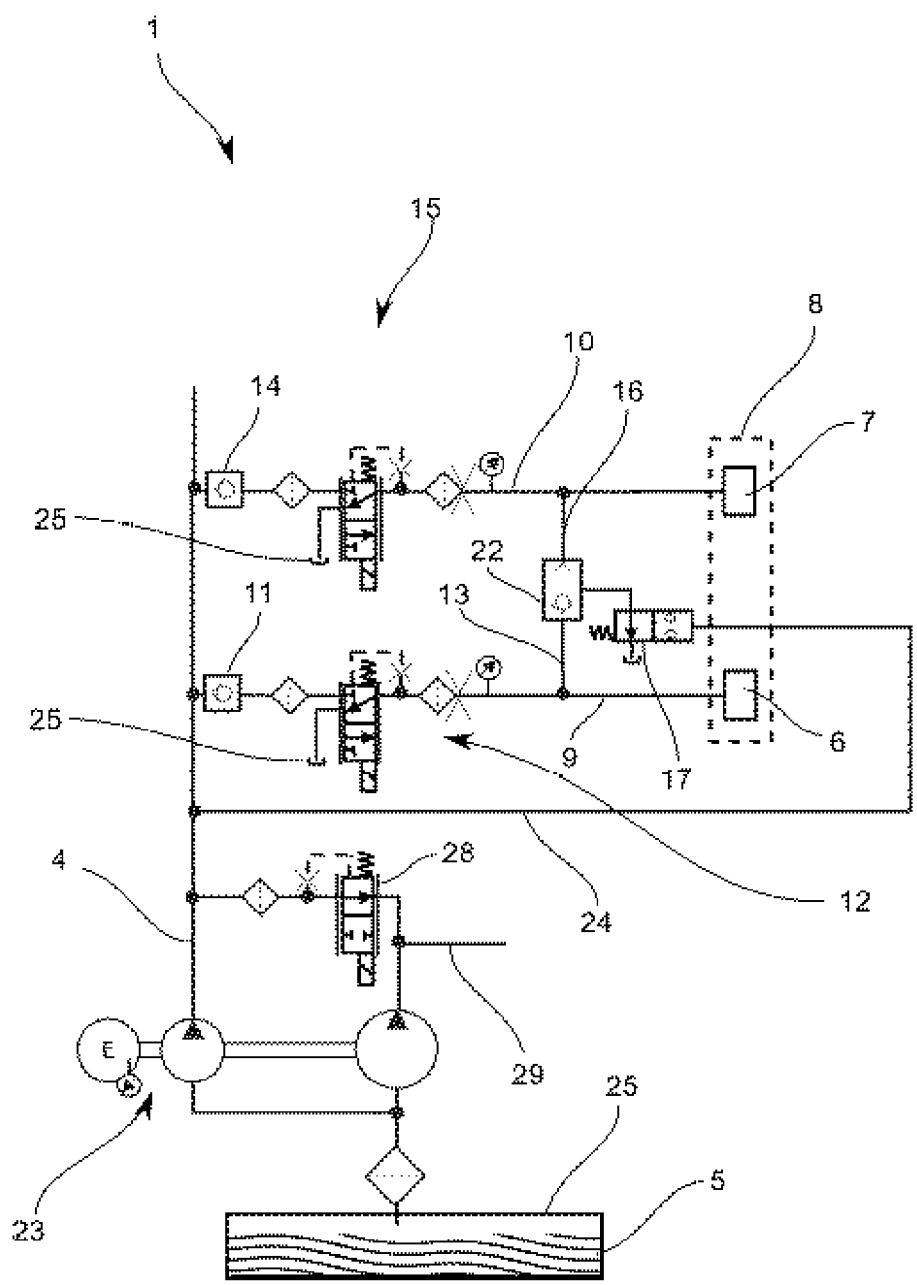
FIG. 2 shows a hydraulic circuit diagram of another exemplary embodiment of a hydraulic arrangement for an electrically operable, multigear axle drive train of a motor vehicle.
Figure 6:
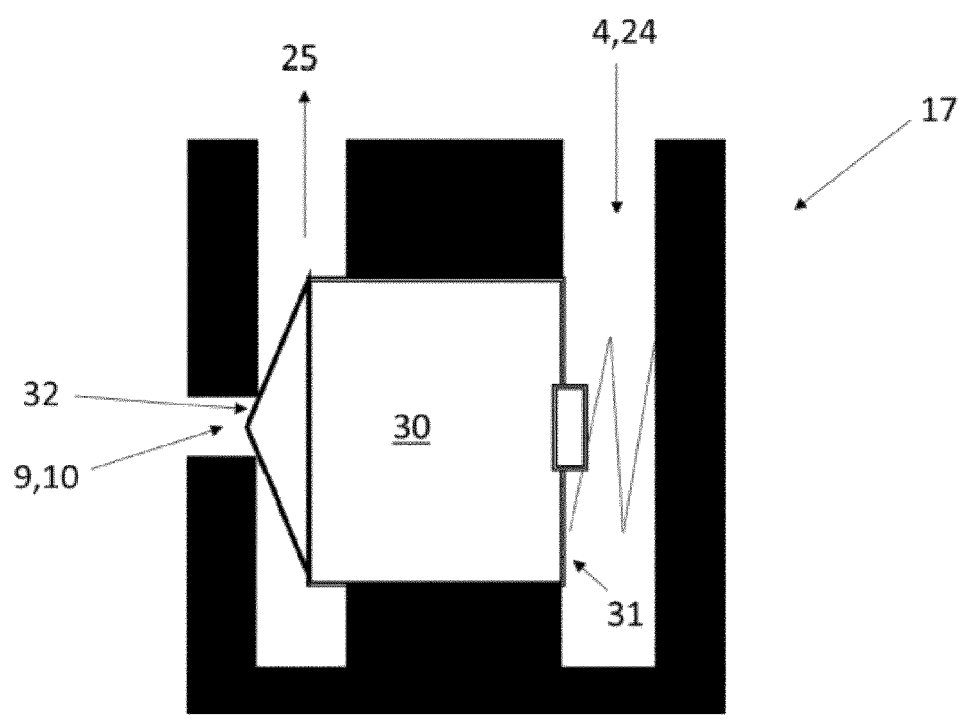
FIG. 6 shows a schematic representation of a 3/2 seat valve.

FIG. 6 shows an embodiment of a passive bypass valve 17 designed as a 3/2 seat valve 20, 21, as shown in FIGS. 2-3. Here, too, it is easy to see that the area ratio between the first area 31, which is connected to the system pressure, and the second area 32 of a translationally displaceable valve closure 30, which is connected to the clutch pressure, is between 1:5-1:15. Here, too, this area ratio serves to keep the valve closure 30 closed against the clutch pressure, which can be higher than the opening pressure or system pressure.

The present disclosure is not limited to the embodiments shown in the figures. The above description is therefore not to be regarded as limiting, but rather as illustrative. The following claims are to be understood as meaning that a named feature is present in at least one embodiment of the present disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Hydraulic arrangement
2 Axle drive train
3 Motor vehicle
4 Hydraulic circuit
5 Hydraulic fluid
6 Clutch device
7 Clutch device
8 Gear selection device
9 First hydraulic path
10 Second hydraulic path
11 Non-return valve
12 Switching valve
13 Third hydraulic path
14 Non-return valve
15 Switching valve
16 Fourth hydraulic path
17 Bypass valve
18 Non-return valve
19 Non-return valve
20 Seat valve
21 Seat valve
22 OR valve
23 Hydraulic pump
24 Fifth hydraulic path
25 Hydraulic reservoir
26 Electric machine
27 Switchable transmission arrangement
28 System pressure valve
29 Cooling line
30 Valve closure
31 Area
32 Area

The invention claimed is:

1. A hydraulic arrangement for an electrically operable, multigear axle drive train of a motor vehicle, comprising:
 a hydraulic circuit in which a hydraulic fluid is guided,
 at hydraulic pump arranged to apply pressure to the hydraulic fluid within the hydraulic circuit,
 a first hydraulic path arranged to connect a first clutch device to the hydraulic circuit, and
 a second hydraulic path arranged to connect a second clutch device to the hydraulic circuit,
 wherein the first and second clutch devices are each arranged to actuate a gear selection device of the electrically operable axle drive train,
 wherein the first hydraulic path has a first non-return valve arranged to connect to the hydraulic circuit and a first switching valve connected downstream in the first hydraulic path,
 wherein a third hydraulic path engaging between the first switching valve and the first clutch device connects the first hydraulic path to the hydraulic circuit,
 wherein the second hydraulic path has a second non-return valve arranged to connect to the hydraulic circuit and a second switching valve connected downstream in the second hydraulic path,
 wherein a fourth hydraulic path engaging between the second switching valve and the second clutch device connects the second hydraulic path to the hydraulic circuit,
 wherein a passive bypass valve is arranged in at least one of the third hydraulic path or the fourth hydraulic path.

2. The hydraulic arrangement according to claim 1, wherein a third non-return valve is arranged in the third hydraulic path as the passive bypass valve.

3. The hydraulic arrangement according to claim 1, wherein a 3/2 seat valve is arranged in the third hydraulic path as the passive bypass valve, wherein an input of the 3/2 seat valve is connected to the third hydraulic path and an output of the 3/2 seat valve opens into a hydraulic reservoir, and the 3/2 seat valve can be switched between an open valve position and a closed valve position via a system pressure applied in a fifth hydraulic path connected to the hydraulic circuit.

4. The hydraulic arrangement according to claim 1, wherein the third hydraulic path and the fourth hydraulic path are connected via an OR valve, so that with the interposition of the passive bypass valve either the third hydraulic path, or the fourth hydraulic path can be hydraulically coupled to a hydraulic reservoir.

5. The hydraulic arrangement according to claim 1, wherein an opening pressure of the bypass valve is lower than a clutch pressure of the clutch devices.

6. The hydraulic arrangement according to claim 1, wherein an opening pressure of the bypass valve is greater than a cooling oil pressure in a cooling line.

7. The hydraulic arrangement according to claim 1, wherein the passive bypass valve has an area ratio of between 1:5 and 1:15 between a first area connected to a system pressure and a second area of a translationally displaceable valve closure connected to a clutch pressure.

8. The hydraulic arrangement according to claim 1, wherein the passive bypass valves is triggered via at least one of a system pressure valve or via the hydraulic pump.

9. The hydraulic arrangement according to claim 1, wherein at least one of the first clutch device or the second clutch device is configured as a brake.

10. An electrically operable, multigear axle drive train of a motor vehicle, comprising
 an electric machine;
 a transmission coupled to the electric machine, the transmission including a gear selection device having a first clutch device and a second clutch device; and
 a hydraulic arrangement including:
  a hydraulic circuit in which a hydraulic fluid is guided, and
  a hydraulic pump arranged to apply pressure to the hydraulic fluid within the hydraulic circuit,
  wherein the first clutch device is connected to the hydraulic circuit via a first hydraulic path,
  wherein the second clutch device is connected to the hydraulic circuit via a second hydraulic path
  wherein the first hydraulic path has a first non-return valve arranged to connect to the hydraulic circuit and a first switching valve connected downstream in the first hydraulic path,
  wherein a third hydraulic path engaging between the first switching valve and the first clutch device connects the first hydraulic path to the hydraulic circuit,
  wherein the second hydraulic path has a second non-return valve arranged to connect to the hydraulic circuit and a second switching valve connected downstream in the second hydraulic path, wherein a fourth hydraulic path engaging between the second switching valve and the second clutch device connects the second hydraulic path to the hydraulic circuit, wherein a passive bypass valve is arranged in at least one of the third hydraulic path or the fourth hydraulic path.

11. The hydraulic arrangement according to claim 2, wherein a fourth non-return valve is arranged in the fourth hydraulic path as a further passive bypass valve.

12. The hydraulic arrangement according to claim 1, wherein a further non-return valve is arranged in the fourth hydraulic path as the passive bypass valve.

13. The hydraulic arrangement according to claim 3, wherein a further 3/2 seat valve is arranged in the fourth hydraulic path as a further passive bypass valve, wherein an input of the further 3/2 seat valve is connected to the fourth hydraulic path and an output of the further 3/2 seat valve opens into the hydraulic reservoir, and the further 3/2 seat valve can be switched between an open valve position and a closed valve position via the system pressure applied in a fifth hydraulic path connected to the hydraulic circuit.

14. The hydraulic arrangement according to claim 1, wherein a 3/2 seat valve is arranged in the fourth hydraulic path as the passive bypass valve, wherein an input of the 3/2 seat valve is connected to the fourth hydraulic path and an output of the 3/2 seat valve opens into a hydraulic reservoir, and the 3/2 seat valve can be switched between an open valve position and a closed valve position via a system pressure applied in a fifth hydraulic path connected to the hydraulic circuit.

15. The electrically operable, multigear axle drive train according to claim 10, wherein a non-return valve is arranged as the passive bypass valve.

16. The electrically operable, multigear axle drive train according to claim 10, wherein a non-return valve is arranged in the third hydraulic path as the passive bypass valve, and a further non-return valve us arranged in the fourth hydraulic path as a further passive bypass valve.

17. The electrically operable, multigear axle drive train according to claim 10, wherein a 3/2 seat valve is arranged in the third hydraulic path as the passive bypass valve, wherein an input of the 3/2 seat valve is connected to the third hydraulic path and an output of the 3/2 seat valve opens into a hydraulic reservoir, and the 3/2 seat valve can be switched between an open valve position and a closed valve position via a system pressure applied in a fifth hydraulic path connected to the hydraulic circuit.

18. The electrically operable, multigear axle drive train according to claim 17, wherein a further 3/2 seat valve is arranged in the fourth hydraulic path as a further passive bypass valve, wherein an input of the further 3/2 seat valve is connected to the fourth hydraulic path and an output of the further 3/2 seat valve opens into the hydraulic reservoir, and the further 3/2 seat valve can be switched between an open valve position and a closed valve position via the system pressure applied in a fifth hydraulic path connected to the hydraulic circuit.

19. The electrically operable, multigear axle drive train according to claim 10, wherein a 3/2 seat valve is arranged in the fourth hydraulic path as the passive bypass valve, wherein an input of the 3/2 seat valve is connected to the fourth hydraulic path and an output of the 3/2 seat valve opens into a hydraulic reservoir, and the 3/2 seat valve can be switched between an open valve position and a closed valve position via a system pressure applied in a fifth hydraulic path connected to the hydraulic circuit.

20. The electrically operable, multigear axle drive train according to claim 10, wherein the third hydraulic path and the fourth hydraulic path are connected via an OR valve, so that with the interposition of the passive bypass valve either the third hydraulic path or the fourth hydraulic path can be hydraulically coupled to a hydraulic reservoir.

* * * * *